United States Patent
Bae et al.

(10) Patent No.: US 10,046,794 B2
(45) Date of Patent: Aug. 14, 2018

(54) RACK ASSIST TYPE ELECTRIC POWER STEERING APPARATUS

(71) Applicant: MANDO CORPORATION, Gyeonggi-do (KR)

(72) Inventors: Jae Hoon Bae, Gyeonggi-do (KR); Dae Hee Jung, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 9 days.

(21) Appl. No.: 15/284,451

(22) Filed: Oct. 3, 2016

(65) Prior Publication Data

US 2017/0096165 A1   Apr. 6, 2017

(30) Foreign Application Priority Data

Oct. 5, 2015   (KR) .................... 10-2015-0139540

(51) Int. Cl.
| | |
|---|---|
| B62D 5/04 | (2006.01) |
| B62D 7/22 | (2006.01) |
| F16H 25/22 | (2006.01) |
| F16H 25/24 | (2006.01) |
| F16H 25/20 | (2006.01) |

(52) U.S. Cl.
CPC ........... *B62D 7/226* (2013.01); *B62D 5/0424* (2013.01); *B62D 5/0448* (2013.01); *F16H 25/2204* (2013.01); *F16H 25/24* (2013.01); *F16H 2025/2096* (2013.01)

(58) Field of Classification Search
CPC .... B62D 7/226; B62D 5/0424; B62D 5/0448; F16H 25/2204
See application file for complete search history.

(56) References Cited

U.S. PATENT DOCUMENTS

| | | | | |
|---|---|---|---|---|
| 6,644,432 | B1 * | 11/2003 | Yost ..................... | B62D 5/0424 180/444 |
| 7,055,646 | B2 * | 6/2006 | Bugosh ............... | B62D 5/0424 180/443 |

(Continued)

FOREIGN PATENT DOCUMENTS

| | | |
|---|---|---|
| JP | 2003-300470 | 10/2003 |
| JP | 2005-319898 | 11/2005 |

(Continued)

OTHER PUBLICATIONS

Office Action dated Oct. 4, 2016 for Korean Patent Application No. 10-2015-0139540 and its English machine translation provided by the Google translate.

*Primary Examiner* — Joseph M Rocca
*Assistant Examiner* — Michael R Stabley
(74) *Attorney, Agent, or Firm* — Ladas & Parry, LLP (57) ABSTRACT

The present invention provides a rack assist type electric power steering apparatus that may include: a ball nut configured to be coupled to the outer circumferential side of a rack bar through balls that are coupled to a screw thread formed on the inner circumferential surface; a nut pulley configured to be coupled to the outer circumferential surface of the central portion of the ball nut in the axial direction; and a rotational support member configured to be coupled between the outer circumferential surface of the ball nut and the rack housing while supporting both side ends of the nut pulley.

12 Claims, 7 Drawing Sheets

(56) References Cited

U.S. PATENT DOCUMENTS

| | | | | |
|---|---|---|---|---|
| 7,278,334 B2* | 10/2007 | Saruwatari | B62D 5/0412 180/444 |
| 7,281,604 B2* | 10/2007 | Murakami | B62D 5/0448 180/444 |
| 8,307,940 B2* | 11/2012 | Bugosh | B62D 5/0448 180/443 |
| 8,479,605 B2* | 7/2013 | Shavrnoch | B62D 5/0448 180/443 |
| 8,540,258 B2* | 9/2013 | Bae | B62D 5/0448 180/444 |
| 8,636,099 B2* | 1/2014 | Kim | B62D 3/02 180/444 |
| 8,651,226 B2* | 2/2014 | Lee | B62D 5/0448 180/443 |
| 8,783,409 B2* | 7/2014 | Lee | B62D 5/0448 180/443 |
| 8,789,648 B2* | 7/2014 | Lee | B62D 5/0427 180/444 |
| 9,199,663 B2* | 12/2015 | Jung | B62D 5/0421 |
| 9,266,555 B2* | 2/2016 | Jeon | B62D 3/08 |
| 9,440,672 B2* | 9/2016 | Holm | B62D 5/0448 |
| 2007/0102230 A1* | 5/2007 | Namgung | B62D 5/0424 180/444 |
| 2010/0319471 A1* | 12/2010 | Nam | B62D 5/0424 74/89.23 |
| 2013/0126261 A1* | 5/2013 | Jung | B62D 5/0421 180/444 |
| 2014/0090921 A1* | 4/2014 | Shavrnoch | F16H 25/2204 180/444 |
| 2014/0238166 A1* | 8/2014 | Jeon | B62D 3/08 74/89.23 |
| 2014/0260727 A1* | 9/2014 | Webber | B62D 5/0424 74/89.23 |
| 2014/0260728 A1* | 9/2014 | Holm | B62D 5/0448 74/89.23 |
| 2014/0302954 A1* | 10/2014 | Ouchi | B62D 5/0424 474/101 |
| 2014/0353068 A1* | 12/2014 | Yamamoto | B62D 5/0412 180/444 |
| 2014/0353070 A1* | 12/2014 | Tsukagoshi | B62D 5/0424 180/444 |
| 2015/0183455 A1* | 7/2015 | Wang | B62D 5/0448 180/444 |

FOREIGN PATENT DOCUMENTS

| | | |
|---|---|---|
| KR | 10-1352301 | 1/2014 |
| KR | 10-2014-0082303 | 7/2014 |

* cited by examiner

RACK ASSIST TYPE ELECTRIC POWER STEERING APPARATUS

CROSS REFERENCE TO RELATED APPLICATION

This application claims priority from Korean Patent Application No. 10-2015-0139540, filed on Oct. 5, 2015, which is hereby incorporated by reference for all purposes as if fully set forth herein.

BACKGROUND OF THE INVENTION

1. Field of the Invention

The present invention relates to a rack assist type electric power steering apparatus, and more particularly, relates to a rack assist type electric power steering apparatus that can: eliminate a rattling noise and the resistance of a steering wheel, which are caused by vibrations that are due to the operation of a ball nut and a rack bar or which are caused by the impact load that is reversely input from the road surface; and improve the driving reliability.

2. Description of the Prior Art

A typical rack assist type electric power steering apparatus is configured to include a steering system including a structure from a steering wheel to wheels on both sides and an assist power mechanism for supplying steering assist power to the steering system.

Figure 1:
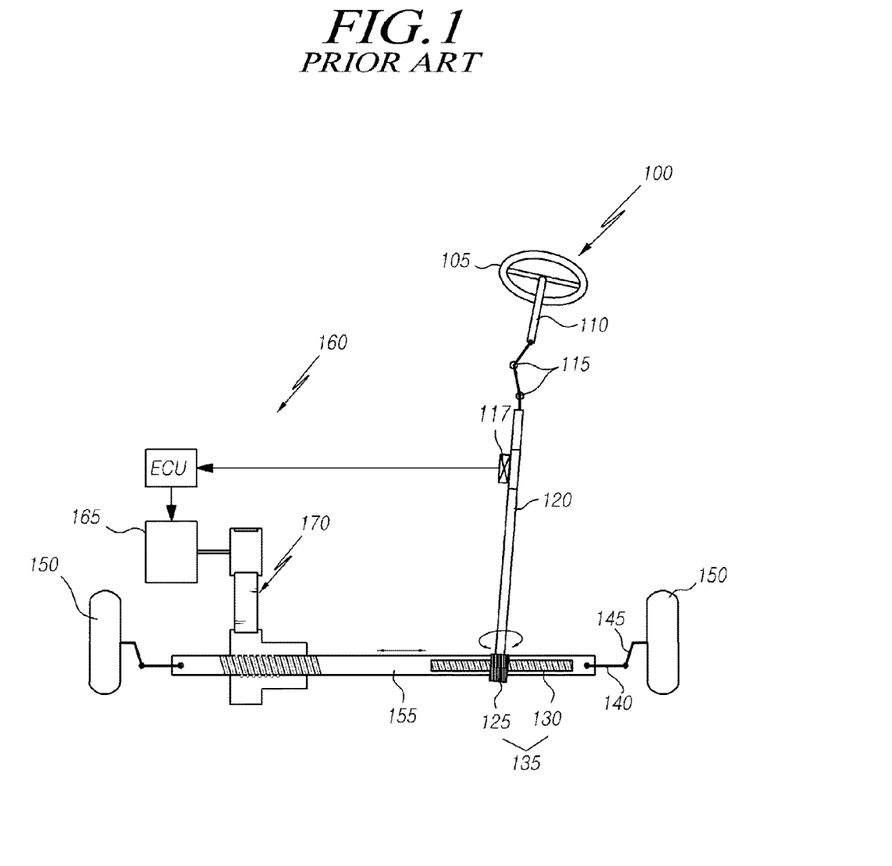
FIG. 1 is a partially cross-sectional view schematically showing a typical rack assist type electric power steering apparatus.
Figure 2:
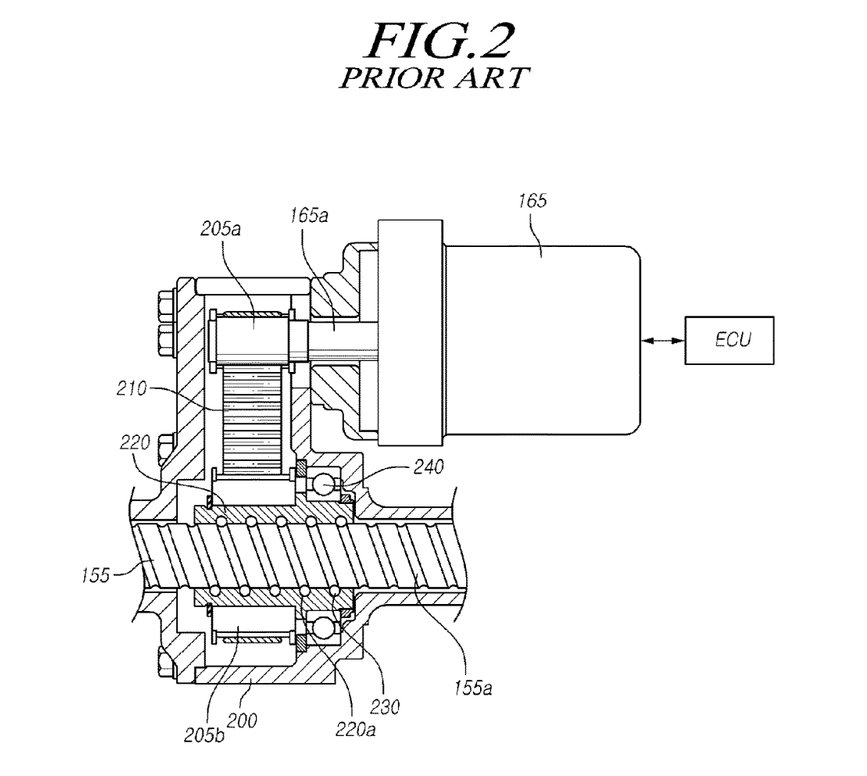
FIG. 2 is a cross-sectional view schematically showing a portion of a typical rack assist type electric power steering apparatus.

FIG. 1 is a partially cross-sectional view schematically illustrating a typical rack assist type electric power steering apparatus, and FIG. 2 is a cross-sectional view schematically illustrating a portion of a typical rack assist type electric power steering apparatus.

A typical rack assist type electric power steering apparatus is configured to include: a steering system 100 that includes a structure from a steering wheel 105 to wheels 150 on both sides; and an assist power mechanism 160 for supplying steering assist power to the steering system.

The steering system 100 is configured to include a steering shaft 110 of which the upper end is coupled to the steering wheel 105 to then be rotated together with the steering wheel 105 and of which the lower end is coupled to a pinion shaft 120 through a pair of universal joints 115. In addition, the pinion shaft 120 is coupled to a rack bar 155 through a rack-pinion mechanism 135, and both ends of the rack bar 155 are coupled to vehicle wheels 150 through tie rods 140 and knuckle arms 145.

The rack-pinion mechanism 135 is formed by the engagement of a pinion gear 125 that is formed at the lower end of the pinion shaft 120 and a rack gear 130 that is formed on one side of the outer circumferential surface of the rack bar 155.

The assist power mechanism 160 is configured to include: a torque sensor 117 that detects a steering torque applied to the steering wheel 105 by the driver in order to thereby output an electric signal in proportion to the detected steering torque; an electronic control unit (ECU) that generates a control signal based on the electric signal that is received from torque sensor 117; a motor 165 that generates steering assist power based on the control signal that is received from the electronic control unit; and a belt-type driving device 170 that transfers the assist power that is generated in the motor 165 to the rack bar 155 through a belt 210.

The belt-type driving device 170 is comprised of a motor 165 that is controlled by the electronic control unit (ECU), a motor pulley 205a that is fixed to a shaft 165a of the motor 165, a belt 210 that is wound around the motor pulley 205a, a ball nut 220 that supports the rack bar 155 inside a rack housing 200 that encloses the rack bar 155, and a nut pulley 205b that is connected to the outer circumferential surface of the ball nut 220.

The ball nut 220 is coupled to the rack bar 155 to be rotatable by means of balls in order to thereby allow the rack bar 155 to slide in the rack housing 200. A bearing 340 for supporting the rotation of the ball nut 220 is mounted on the outer circumferential surface of the ball nut 220.

However, in the prior art described above, when the ball nut rotates to slide the rack bar, the resistance of the steering wheel as well as noise and vibration, which are caused by the rack bar, the ball nut, the nut pulley, the bearing, and the rack housing, occurs.

In addition, when the belt operates by the motor, the ball nut and the nut pulley may be deformed or damaged due to the vibration that is transferred to the nut pulley and the ball nut or due to the impact that is transferred from the road surface through the rack bar in order to thereby cause a serious safety problem whereby the steering wheel is locked while driving.

SUMMARY OF THE INVENTION

Therefore, the present invention has been made in the above-described background and has an object to provide a rack assist type electric power steering apparatus that can eliminate a rattling noise and the resistance of a steering wheel, which are caused by the vibration according to the operation of the ball nut and the rack bar or which are caused by the impact load that is reversely input from the road surface, and that can improve the driving reliability.

In addition, the object of the present invention is not limited thereto, and it is obvious to those skilled in the art to understand other objects from the description below, which have not been described above.

In order to achieve the object above, the present invention provides a rack assist type electric power steering apparatus that may include: a ball nut that is configured to be coupled to the outer circumferential side of a rack bar by means of balls that are coupled to a screw thread formed on the inner circumferential surface; a nut pulley that is configured to be coupled to the outer circumferential surface of the central portion of the ball nut in the axial direction; and a rotational support member that is configured to be coupled between the outer circumferential surface of the ball nut and the rack housing while supporting both side ends of the nut pulley.

According to the present invention, a rattling noise and the resistance of a steering wheel can be eliminated, which are caused by the vibration according to the operation of the ball nut and the rack bar or which are caused by the impact load that is reversely input from the road surface, and the possibility of the damage to the ball nut and the nut pulley can be reduced in order to thereby improve the driving reliability.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Hereinafter, embodiments of the present invention will be described in detail with reference to the accompanying drawings. In adding reference numerals to elements in each drawing, the same elements will be designated by the same reference numerals, if possible, although they are shown in different drawings. Further, in the following description of the present invention, a detailed description of known functions and configurations incorporated herein will be omitted when it is determined that the description may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 3:
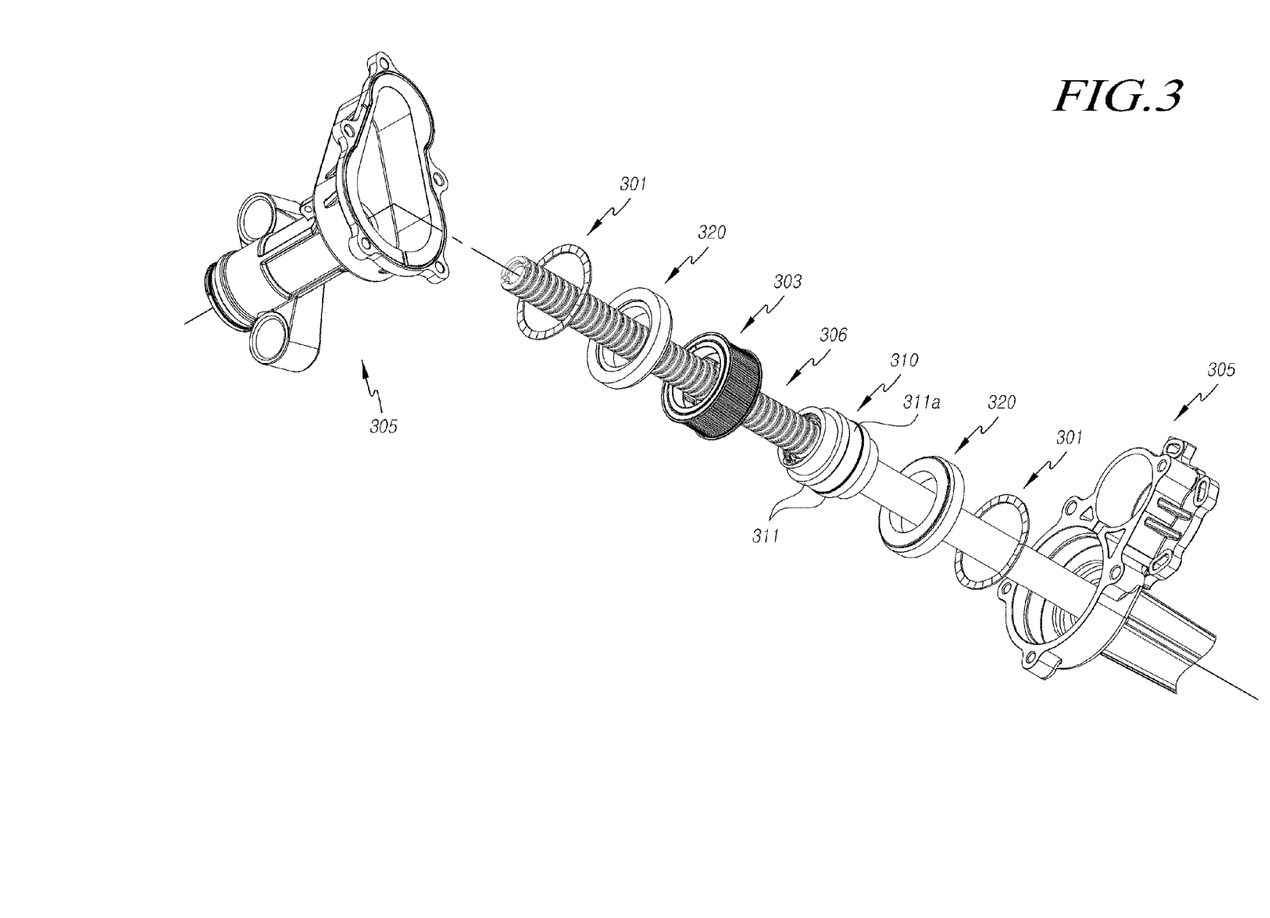
FIG. 3 is an exploded perspective view showing a portion of a rack assist type electric power steering apparatus, according to the embodiment of the present invention.
Figure 4:
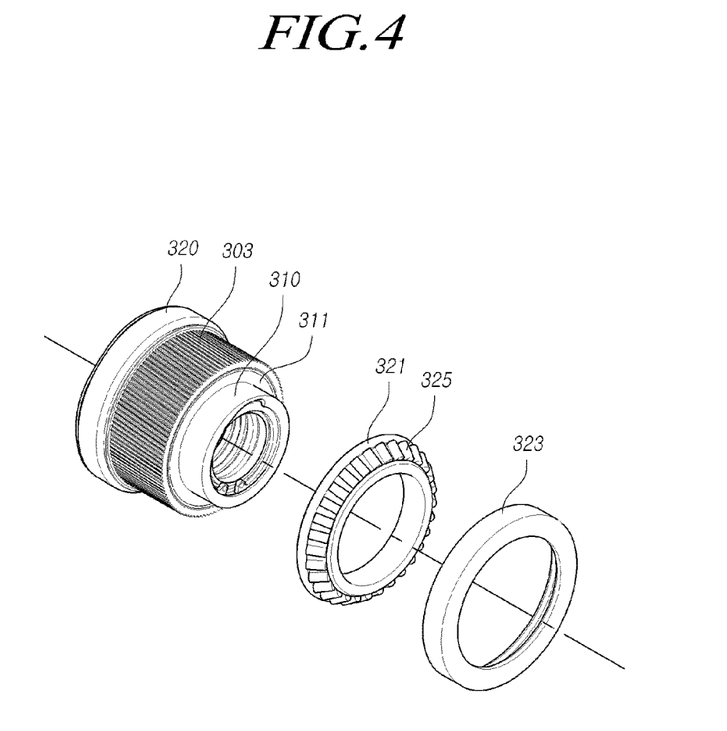
FIG. 4 is an exploded perspective view showing a portion of a rack assist type electric power steering apparatus, according to the embodiment of the present invention.
Figure 5:
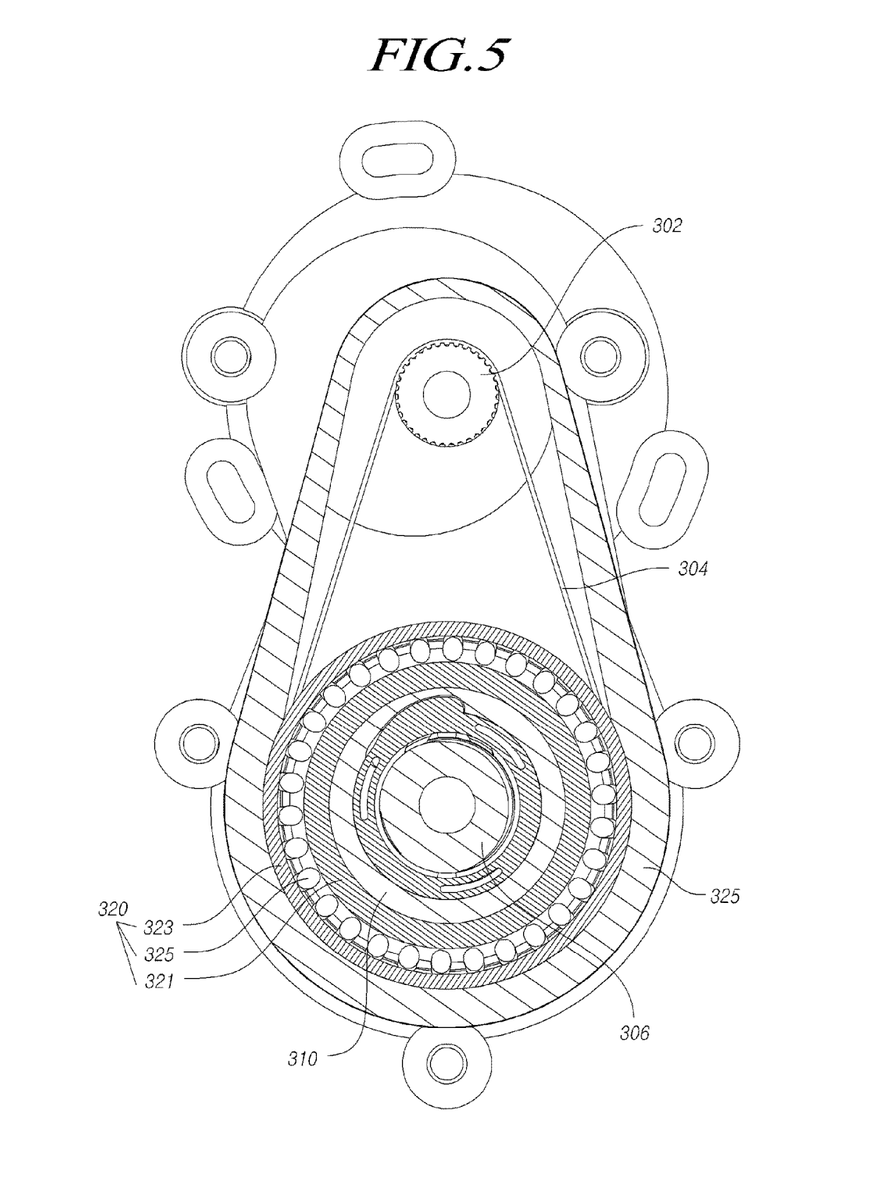
FIG. 5 is a cross-sectional view showing a portion of a rack assist type electric power steering apparatus, according to the embodiment of the present invention.
Figure 6:
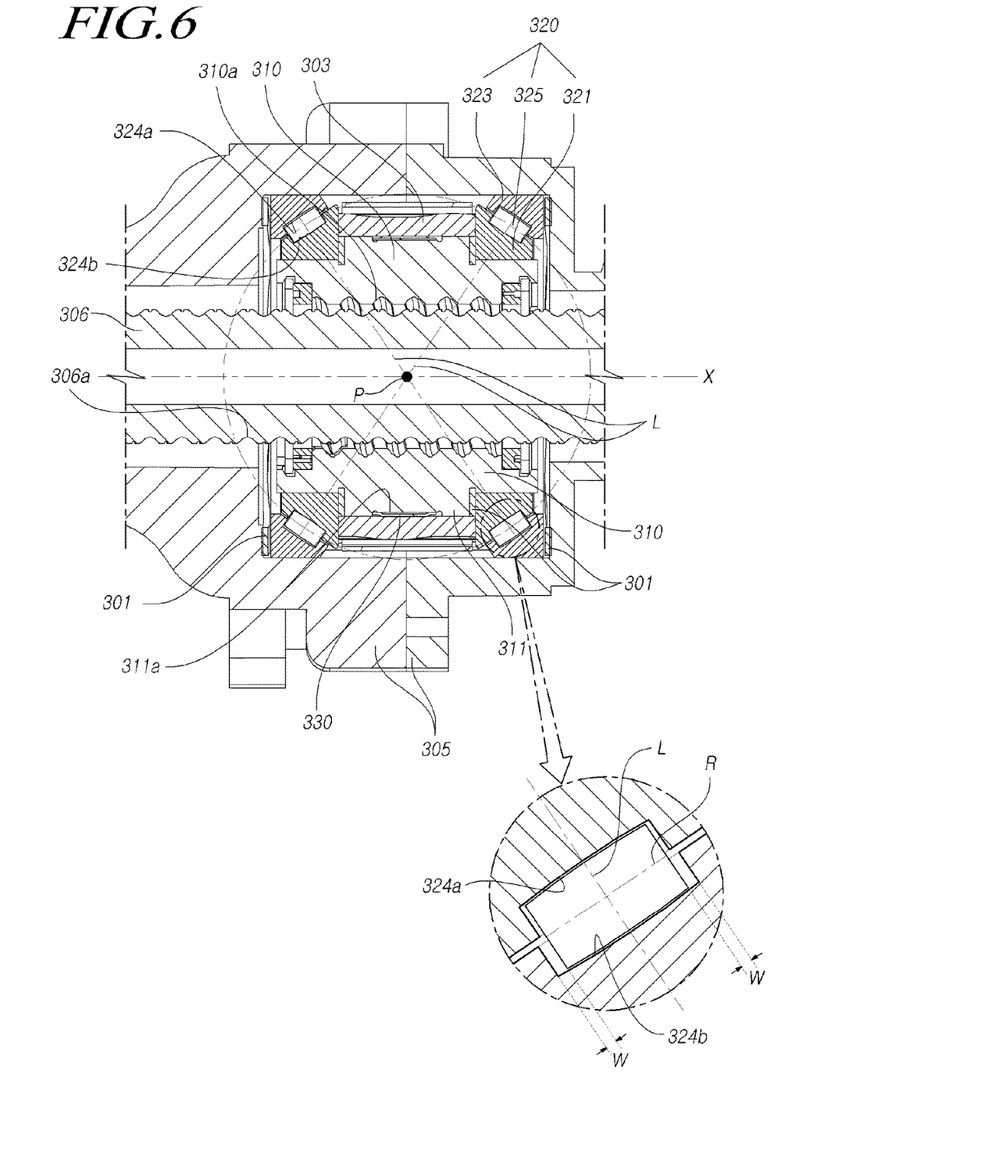
FIG. 6 is a cross-sectional view showing a portion of a rack assist type electric power steering apparatus, according to the embodiment of the present invention.
Figure 7:
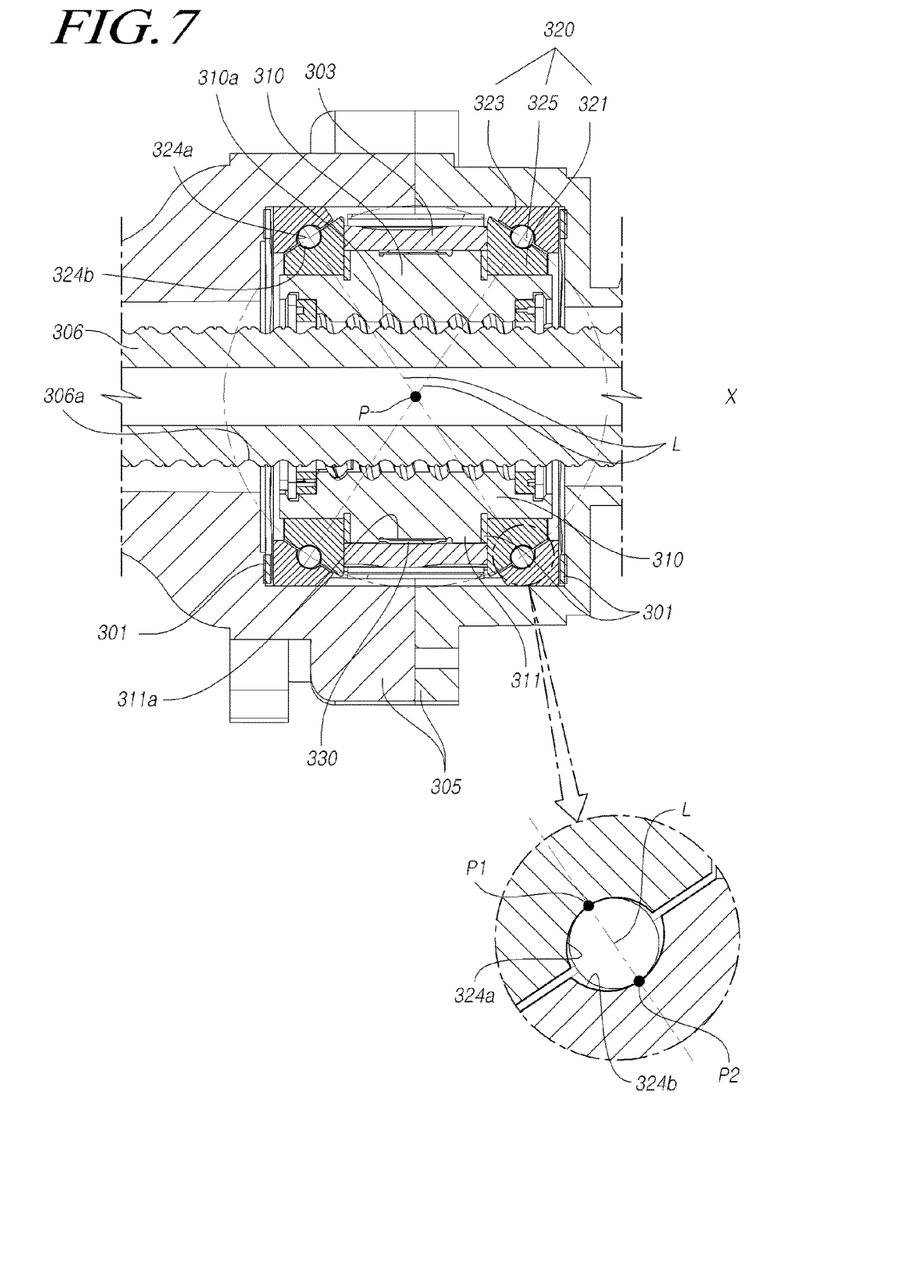
FIG. 7 is a cross-sectional view showing a portion of a rack assist type electric power steering apparatus, according to the embodiment of the present invention.

FIG. 3 is an exploded perspective view showing a portion of a rack assist type electric power steering apparatus, according to the embodiment of the present invention. FIG. 4 is an exploded perspective view showing a portion of the rack assist type electric power steering apparatus, according to the embodiment of the present invention. FIG. 5 is a cross-sectional view showing a portion of the rack assist type electric power steering apparatus, according to the embodiment of the present invention. FIG. 6 is a cross-sectional view showing a portion of the rack assist type electric power steering apparatus, according to the embodiment of the present invention. FIG. 7 is a cross-sectional view showing a portion of the rack assist type electric power steering apparatus, according to the embodiment of the present invention.

As shown in the drawings above, the rack assist type electric power steering apparatus, according to the embodiment of the present invention, may include: a ball nut 310 that is coupled to the outer circumferential side of the rack bar 306 by means of balls that are connected to a screw thread 310a formed on the inner circumferential surface; a nut pulley 303 that is coupled to the outer circumferential surface in the central portion of the ball nut 310 in the axial direction; and a rotational support member 320 that is coupled between the outer circumferential surface of the ball nut 310 and the rack housing 305 while supporting both side ends of the nut pulley 303.

The rack assist type electric power steering apparatus, according to the present invention, adopts a driving means and a driven means, and the driving means is comprised of a motor (see 165 of FIG. 2) that is controlled by an electronic control unit (ECU), a motor pulley 302 that is coupled to a shaft (165a of FIG. 2) of the motor, and a belt 304.

In addition, the driven means is comprised of the ball nut 310 that supports the rack bar 306 inside the rack housing 305 that encloses the rack bar 306 and a nut pulley 303 that is coupled to the outer circumferential surface of the ball nut 310.

The motor pulley 302, which is connected to the motor, is disposed in parallel with the nut pulley 303 that is coupled to the rack bar 306. The belt 304 is wound around the motor pulley 302 and the nut pulley 303 to transfer the rotational force of the motor to the rack bar 306 through the ball nut 310, and the rack bar 306 is moved left and right by the operation of the ball nut 310 in order to thereby generate steering assist power.

The ball nut 310 is coupled to the rack bar 306 by means of balls (not shown) and then rotates in order to thereby slide the rack bar 306 inside the rack housing 305, and the nut pulley 303 for rotating the ball nut 310 is coupled to the outer circumferential surface of the central portion of the ball nut 310 in the axial direction. The rotational support member 320 is coupled to both sides of the outer circumferential surface of the ball nut 310, which supports the rotation of the ball nut 310 while supporting both side ends of the nut pulley 303.

A power transmission structure is provided on the inner circumferential surface of the ball nut 310 and on the outer circumferential surface of the rack bar 306, which slides the rack bar 306 in the axial direction in order to thereby generate a steering assist force. The power transmission structure is comprised of: a screw thread 306a that is spirally formed on the outer circumferential surface of the rack bar 306 to have a cross-section in the shape of a hemisphere or in the shape of an arc; balls (not shown) that are inserted thereto; and a screw thread 310a that is spirally formed on the inner circumferential surface of the ball nut 310 to have a cross-section in the shape of a hemisphere or in the shape of an arc corresponding to the screw thread 306a of the rack bar 306.

The ball nut 310 is a hollow tube that has a screw thread 310a on the inner circumferential surface thereof, and a large diameter portion 311 is formed to radially and outwardly protrude from the central portion in the axial direction. The nut pulley 303 is connected to the outer circumferential surface of the large diameter portion 311.

The rotational support members 320 that are coupled to both sides of the outer circumferential surface of the ball nut 310 rest on step portions that are provided at both side ends of the ball nut 310 and on both sides of the large diameter portion 311 in order to thereby support both side ends of the nut pulley 303.

In addition, a groove 311a is formed on the large diameter portion 311 of the ball nut 310 in the circumferential direction, and a tolerance ring 330 is connected between the same and the nut pulley 303 to apply an elastic force in the radial direction in order to thereby prevent the nut pulley 303 from popping out of the ball nut 310.

The rotational support member 320 includes: an inner support member 321 that is coupled to, and is supported by, a step portion of the outer circumferential surface of the ball nut 310; an outer support member 323 that is coupled to, and is supported by, a step portion formed on the inner circumferential surface of the rack housing 305; and a rolling member 325 that is coupled to be rotated between the inner support member 321 and the outer support member 323.

In addition, facing surfaces of the inner support member 321 and the outer support member 323 are formed to be inclined, and the rolling member 325 is coupled to the inclined surfaces. Thus, such a structure can withstand the rotational load of the ball nut 310 even when an external force that is transferred through the rack bar 306 from the road surface occurs in the axial direction and at a specific angle, as well as when the ball nut 310 operates.

In addition, the inclined surfaces of the inner support member 321 and the outer support member 323 have coupling grooves 324a and 324b, respectively, to which the rolling member 325 is coupled, and the gap W between the coupling groove 324b of the outer support member 323 and the rolling member 325 is configured to be greater than the gap between the coupling groove 324a of the inner support member 321 and the rolling element 325.

Accordingly, even when the ball nut 310 pivots at a specific angle with respect to the axial direction, the rolling member 325 may instantaneously and minutely move inside the coupling groove 324b of the outer support member 323 in the pivotal direction in order to thereby prevent the rolling member 325 from being stuck in the coupling groove 324b or in order to thereby prevent the impact thereof.

A pivotal load occurs at a specific angle with respect to the axial direction of the ball nut 310, which is caused by a change in the tension due to a rotational direction change of the belt 304 in the case of a reversal of the steering wheel (that is, when the operation direction of the steering wheel is changed) because of the vibration caused by the operation of the ball nut 310 and the rack bar 306 or because of the impact load that is reversely input from the road surface. In this case, the rotational support member 320, which is disposed in the circumferential direction based on the point (P) of the inner central portion of the ball nut 310, may continue to support the ball nut 310.

Here, the rolling member 325 may be configured with rollers or balls. In the case where the rolling member 325 is configured with rollers, as shown in FIG. 6, the rollers 325 are coupled to the positions where the imaginary line L that connects the point (P) of the inner central portion of the ball nut 310 and the center of the roller 325 is perpendicular to the rotational axis (R) of the roller on the plane in which the central axis of the rack bar 306 and the ball nut 310 forms a straight line.

In addition, in the case where the rolling member 325 is configured with balls that come into contact with the inner support member 321 and the outer support member 323 at points (P1 and P2), respectively, as shown in FIG. 7, the balls 325 are coupled such that the contact points (P1 and P2) are positioned on the imaginary line L that connects the point (P) of the inner central portion of the ball nut 310 and the center of the ball 325 on the plane in which the central axis of the rack bar 306 and the ball nut 310 forms a straight line.

Therefore, although a variety of loads (such as the vibration caused by the operation of the ball nut 310 and the rack bar 306 or the impact load that is reversely input from the road surface) are transferred to the ball nut, a rattling noise and the resistance of a steering wheel may be eliminated, and furthermore, the damage to the ball nut 310 and the balls may be prevented.

Meanwhile, the elastic support member 301 is coupled between the outer support member 323 and the rack housing 305 to provide an elastic force in the axial direction in order to thereby rigidly support one side and the other side of the rotational support member 320 while absorbing the vibration caused by the operation of the ball nut 310 and the rack bar 306 or the impact load that is reversely input from the road surface.

In addition, the elastic support member 301 may be coupled between the inner support member 321 and the large diameter portion 311 to provide an elastic force in the axial direction.

Here, the elastic support member 301 is shaped into a ring of a thin plate made of a metal, and is formed with a leaf spring of which the protruding lengths of the inner radial portion and the outer radial portion in the axial direction are different from each other to be elastically deformable in the axial direction in order to thereby elastically support the rotational support member 320 in the axial direction while being supported by the rack housing 305.

The present invention described above can eliminate a rattling noise and the resistance of a steering wheel, which are caused by the vibration according to the operation of the ball nut and the rack bar or which are caused by the impact load that is reversely input from the road surface, and can further reduce the possibility of the damage to the ball nut and the nut pulley in order to thereby improve the driving reliability.

Even if it was described above that all of the components of an embodiment of the present invention are coupled as a single unit or coupled to be operated as a single unit, the present invention is not necessarily limited to such an embodiment. That is, at least two elements of all structural elements may be selectively joined and operate without departing from the scope of the present invention.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present invention expressly defines them so.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A rack assist type electric power steering apparatus comprising:

a ball nut coupled to the outer circumferential side of a rack bar through balls that are coupled to a screw thread formed on the inner circumferential surface of the ball nut;

a nut pulley coupled to the outer circumferential surface of the central portion of the ball nut in the axial direction; and a rotational support member coupled between the outer circumferential surface of the ball nut and a rack housing while supporting both side ends of the nut pulley, wherein the rotational support member comprises: an inner support member coupled to a step portion of the outer circumferential surface of the ball nut; an outer support member be coupled to a step portion of the inner circumferential surface of the rack housing; and a rolling member disposed between the inner support member and the outer support member, and wherein the inner support member and the outer support member have coupling grooves, respectively, in which the rolling member is disposed, and a gap between the coupling groove of the outer support member and the rolling member is greater than a gap between the coupling groove of the inner support member and the rolling element.

2. The apparatus according to claim 1, wherein the ball nut is configured to have a large diameter portion that is formed to radially and outwardly protrude from the central portion in the axial direction, and the nut pulley is coupled to the outer circumferential surface of the large diameter portion.

3. The apparatus according to claim 2, wherein the rotational support member rests on both side ends of the ball nut and on step portions that are provided on both sides of the large diameter portion.

4. The apparatus according to claim 3, wherein the inner support member is configured to be supported by the step portion of the outer circumferential surface of the ball nut, and the outer support member is configured to be supported by the step portion of the inner circumferential surface of the rack housing.

5. The apparatus according to claim 4, wherein facing surfaces of the inner support member and the outer support member are formed to be inclined, and the rolling member is coupled to the inclined surfaces.

6. The apparatus according to claim 4, wherein an elastic support member is configured to be coupled between the outer support member and the rack housing to provide an elastic force in the axial direction.

7. The apparatus according to claim 4, wherein an elastic support member is configured to be coupled between the inner support member and the large diameter portion to provide an elastic force in the axial direction.

8. The apparatus according to claim 4, wherein the rolling member is configured with a roller, and the roller is coupled to the position where an imaginary line that connects a point of an inner central portion of the ball nut and a center of the roller is perpendicular to the rotational axis of the roller on the plane in which the central axis of the rack bar and the ball nut forms a straight line.

9. The apparatus according to claim 4, wherein the rolling member is configured with a ball that comes into contact with the inner support member and the outer support member at respective points, and the ball is coupled such that the contact points are positioned on the imaginary line that connects the point of the inner central portion of the ball nut and a center of the ball on the plane in which the central axis of the rack bar and the ball nut forms a straight line.

10. A rack assist type electric power steering apparatus comprising:

a ball nut coupled to the outer circumferential side of a rack bar through balls that are coupled to a screw thread formed on the inner circumferential surface;

a nut pulley coupled to the outer circumferential surface of the central portion of the ball nut in the axial direction; and a rotational support member coupled between the outer circumferential surface of the ball nut and a rack housing while supporting both side ends of the nut pulley, wherein the rotational support member comprises:

an inner support member is configured to be supported by the outer circumferential surface of the ball nut;

an outer support member is configured to be supported by the inner circumferential surface of the rack housing;

a rolling member is configured to be coupled between the inner support member and the outer support member, and wherein inclined surfaces of the inner support member and the outer support member have coupling grooves, respectively, to which the rolling member is coupled, and wherein a gap between the coupling groove of the outer support member and the rolling member is different from a gap between the coupling groove of the inner support member and the rolling element.

11. The apparatus according to claim 10, wherein the rolling member is configured with a roller, and the roller is coupled to the position where an imaginary line that connects a point of an inner central portion of the ball nut and a center of the roller is perpendicular to the rotational axis of the roller on the plane in which the central axis of the rack bar and the ball nut forms a straight line.

12. The apparatus according to claim 10, wherein facing surfaces of the inner support member and the outer support member are formed to be inclined, and the rolling member is coupled to the inclined surfaces.

\* \* \* \* \*